(12) United States Patent
Fujisawa et al.

(10) Patent No.: US 11,165,253 B2
(45) Date of Patent: Nov. 2, 2021

(54) POWER CONTROL SYSTEM AND CONTROL DEVICE

(71) Applicant: Mitsubishi Electric Corporation, Tokyo (JP)

(72) Inventors: Takayuki Fujisawa, Tokyo (JP); Keisuke Ishida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 379 days.

(21) Appl. No.: 16/320,405

(22) PCT Filed: Aug. 1, 2016

(86) PCT No.: PCT/JP2016/072510
§ 371 (c)(1),
(2) Date: Jan. 24, 2019

(87) PCT Pub. No.: WO2018/025307
PCT Pub. Date: Feb. 8, 2018

(65) Prior Publication Data
US 2021/0021129 A1    Jan. 21, 2021

(51) Int. Cl.
*H02J 3/34* (2006.01)
*H02J 3/18* (2006.01)
(Continued)

(52) U.S. Cl.
CPC .............. *H02J 3/34* (2013.01); *H02J 3/1857* (2013.01); *H02J 3/36* (2013.01); *H02M 5/4585* (2013.01); *H02M 7/4835* (2021.05)

(58) Field of Classification Search
CPC ........ H02J 3/06; H02J 3/16; H02J 3/36; H02J 3/34; H02J 3/1835; H02J 3/1842;
(Continued)

(56) References Cited

U.S. PATENT DOCUMENTS 6,411,067 B1    6/2002 Bjoerklund
8,994,206 B2 *  3/2015 Bala ..................... H02J 3/36
                                                290/55
(Continued)

OTHER PUBLICATIONS

International Search Report (PCT/ISA/210) dated Aug. 23, 2016, by the Japan Patent Office as the International Searching Authority for International Application No. PCT/JP2016/072510.
(Continued)

*Primary Examiner* — Fred E Finch, III
(74) *Attorney, Agent, or Firm* — Buchanan Ingersoll & Rooney PC (57) ABSTRACT

A power control system includes: a first AC/DC converter; a second AC/DC converter; a first switch connected between a first transmission line of a first power system having a first system frequency and the first AC/DC converter; a second switch connected between the first transmission line and the second AC/DC converter; a third switch connected between a second transmission line of a second power system having a second system frequency and the first AC/DC converter; a fourth switch connected between the second transmission line and the second AC/DC converter; a fifth switch connected between the first AC/DC converter and the second AC/DC converter; and a control device. When the first and second AC/DC converters are caused to operate as AC/DC converters in a BTB (Back to Back) method, the control device controls at least the fifth switch to be in a closed state.

18 Claims, 7 Drawing Sheets

(51) Int. Cl.
*H02M 5/458* (2006.01)
*H02M 7/483* (2007.01)
*H02J 3/36* (2006.01)

(58) Field of Classification Search
CPC ...... H02J 3/1857; H02M 1/12; H02M 1/4233;
H02M 5/27; H02M 7/483; H02M 5/4585;
H02M 7/4835
See application file for complete search history.

(56) References Cited

U.S. PATENT DOCUMENTS

| | | | |
|---|---|---|---|
| 10,164,428 B2* | 12/2018 | Shen | H02M 7/483 |
| 10,732,214 B2* | 8/2020 | Lewis | H02H 1/0007 |
| 2012/0173035 A1* | 7/2012 | Abe | H02J 3/00 |
| | | | 700/297 |
| 2012/0267955 A1* | 10/2012 | Zhan | H02J 1/06 |
| | | | 307/31 |
| 2016/0254668 A1* | 9/2016 | Huang | H02J 3/34 |
| | | | 307/64 |
| 2017/0331390 A1* | 11/2017 | Xu | H02M 5/4585 |
| 2018/0069469 A1* | 3/2018 | Gupta | H02J 3/36 |
| 2018/0115164 A1* | 4/2018 | Gupta | H02M 1/36 |
| 2018/0366942 A1* | 12/2018 | Gupta | H02H 7/1216 |
| 2019/0074685 A1* | 3/2019 | Leon Garcia | H02J 3/36 |
| 2020/0136389 A1* | 4/2020 | Leon Garcia | H01L 39/16 |
| 2020/0395757 A1* | 12/2020 | Mukhedkar | H02J 3/36 |

OTHER PUBLICATIONS

Written Opinion (PCT/ISA/237) dated Aug. 23, 2016, by the Japan Patent Office as the International Searching Authority for International Application No. PCT/JP2016/072510.

* cited by examiner

| No. | MODE | sw1 | sw2 | sw3 | sw4 | sw5 |
|---|---|---|---|---|---|---|
| 1 | BTB | ON | – | – | ON | ON |
| 2 | BTB | – | ON | ON | – | ON |
| 3 | SGL (50Hz) | ON | – | – | – | – |
| 4 | SGL (50Hz) | – | ON | – | – | – |
| 5 | SGL (60Hz) | – | – | – | ON | – |
| 6 | SGL (60Hz) | – | – | ON | – | – |
| 7 | SGL (50Hz+60Hz) | ON | – | – | ON | – |
| 8 | SGL (50Hz+60Hz) | – | ON | ON | – | – |
| 9 | DBL(50Hz) | ON | ON | – | – | – |
| 10 | DBL(60Hz) | – | – | ON | ON | – |

POWER CONTROL SYSTEM AND CONTROL DEVICE

TECHNICAL FIELD

The present disclosure relates to a power control system and a control device, and more particularly to a power control system and a control device for controlling power of a plurality of power systems having different system frequencies.

BACKGROUND ART

A power electronics-based electrical device, called a flexible AC transmission systems (FACTS) device, has been conventionally employed for the purpose of stabilizing a power transmission system. Examples of known FACTS devices include a static synchronous compensator (STATCOM).

The specification of U.S. Pat. No. 6,411,067 (PTL 1), for example, discloses a device for controlling the flow of electric power in a transmission line carrying alternating current. This device includes a first voltage source converter connected to the transmission line at a first point, a second voltage source converter connected to the transmission line at a second point, and a by-pass switch connected to the transmission line between the first point and the second point in parallel with the first and second voltage source converters. The first and second voltage source converters operate as BTB (Back to Back) stations when the by-pass switch is open, and as static var compensators when the by-pass switch is closed.

CITATION LIST

Patent Literature

PTL 1: Specification of U.S. Pat. No. 6,411,067

SUMMARY OF INVENTION

Technical Problem

In the technique of PTL 1, however, if the system frequency varies between the first point and the second point of the transmission line, the by-pass switch cannot be thrown, resulting in failure to operate the first and second voltage source converters as var compensators.

The present disclosure has been made in order to solve the above-described problem, and aims in one aspect to provide a power control system and a control device capable of implementing flexible and appropriate power control in a plurality of power systems having system frequencies different from each other.

Solution to Problem

A power control system according to one embodiment includes: a first AC/DC converter; a second AC/DC converter; a first switch connected between a first transmission line of a first power system having a first system frequency and an AC terminal of the first AC/DC converter; a second switch connected between the first transmission line and an AC terminal of the second AC/DC converter; a third switch connected between a second transmission line of a second power system having a second system frequency different from the first system frequency and the AC terminal of the first AC/DC converter; a fourth switch connected between the second transmission line and the AC terminal of the second AC/DC converter; a fifth switch connected between a DC terminal of the first AC/DC converter and a DC terminal of the second AC/DC converter; and a control device configured to control operation of the first and second AC/DC converters, and the first to fifth switches. When the first and second AC/DC converters are caused to operate as AC/DC converters in a BTB (Back to Back) method, the control device controls at least the fifth switch to be in a closed state, and when the first and second AC/DC converters are caused to operate as reactive power compensation devices, the control device controls at least the fifth switch to be in an opened state.

According to another embodiment, a control device for controlling power of a first power system having a first system frequency, and a second power system having a second system frequency different from the first system frequency is provided. The control device includes: a converter control unit configured to control operation of a first AC/DC converter and a second AC/DC converter; and a switch control unit configured to control operation of first, second, third, fourth and fifth switches. The first switch is connected between a first transmission line of the first power system and an AC terminal of the first AC/DC converter. The second switch is connected between the first transmission line and an AC terminal of the second AC/DC converter. The third switch is connected between a second transmission line of the second power system and the AC terminal of the first AC/DC converter. The fourth switch is connected between the second transmission line and the AC terminal of the second AC/DC converter. The fifth switch is connected between a DC terminal of the first AC/DC converter and a DC terminal of the second AC/DC converter. When the converter control unit causes the first and second AC/DC converters to operate as AC/DC converters in a BTB (Back to Back) method, the switch control unit controls at least the fifth switch to be in a closed state. When the converter control unit causes the first and second AC/DC converters to operate as reactive power compensation devices, the switch control unit controls at least the fifth switch to be in an opened state.

Advantageous Effects of Invention

According to the present disclosure, flexible and appropriate power control can be implemented in a plurality of power systems having system frequencies different from each other.

DESCRIPTION OF EMBODIMENTS

In the following, embodiments of the present invention are described with reference to the drawings. The same components are designated by the same symbols in the following description. Their names and functions are also the same. Thus, detailed description thereof will not be repeated.

<Overall Configuration>

Figure 1:
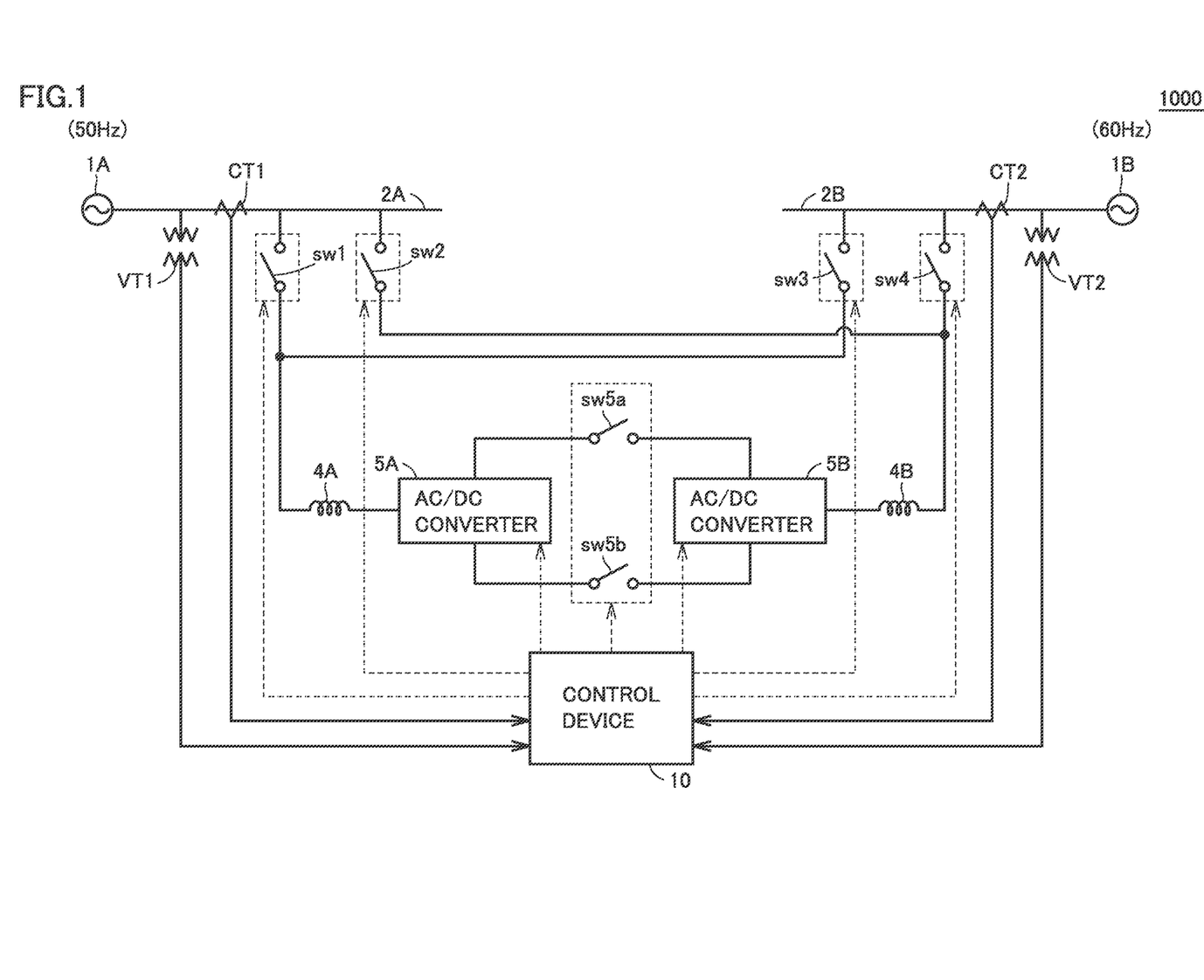
FIG. 1 shows an example of an overall configuration of a power control system.

FIG. 1 shows an example of an overall configuration of a power control system. Referring to FIG. 1, the power control system includes power systems 1A, 1B, transmission lines 2A, 2B, a plurality of interconnected reactors 4A, 4B, a plurality of AC/DC converters 5A, 5B, a plurality of switches sw1, sw2, sw3, sw4, sw5a, sw5b (hereinafter also referred to collectively as "switches sw"), and a control device 10. The switches may each be a breaker or a disconnector.

In the present embodiment, power system 1A is a three-phase AC system having a system frequency of 50 Hz, and power system 1B is a three-phase AC system having a system frequency of 60 Hz. In this manner, power system 1A and power system 1B have system frequencies different from each other.

Switch sw1 is connected between transmission line 2A of power system 1A and an AC side terminal (AC terminal) of AC/DC converter 5A. Specifically, switch sw1 has a primary side terminal (primary terminal) connected to transmission line 2A, and a secondary side terminal (secondary terminal) connected to the AC terminal of AC/DC converter 5A via interconnected reactor 4A.

Switch sw2 is connected between transmission line 2A and an AC terminal of AC/DC converter 5B. Specifically, switch sw2 has a primary terminal connected to transmission line 2A, and a secondary terminal connected to the AC terminal of AC/DC converter 5B via interconnected reactor 4B.

Switch sw3 is connected between transmission line 2B of power system 1B and the AC terminal of AC/DC converter 5A. Specifically, switch sw3 has a primary terminal connected to transmission line 2B, and a secondary terminal connected to the AC terminal of AC/DC converter 5A via interconnected reactor 4A.

Switch sw4 is connected between transmission line 2B and the AC terminal of AC/DC converter 5B. Specifically, switch sw4 has a primary terminal connected to transmission line 2B, and a secondary terminal connected to the AC terminal of AC/DC converter 5B via interconnected reactor 4B.

Switches sw5a, sw5b (hereinafter also referred to collectively as "switches sw5") are connected between a DC side terminal (DC terminal) of AC/DC converter 5A and a DC terminal of AC/DC converter 5B. Specifically, switch sw5a is connected between a positive-side DC terminal (positive DC terminal) of AC/DC converter 5A and a positive DC terminal of AC/DC converter 5B. Switch sw5b is connected between a negative-side DC terminal (negative DC terminal) of AC/DC converter 5A and a negative DC terminal of AC/DC converter 5B.

AC/DC converters 5A, 5B are each formed of a self-excited voltage-type power converter capable of controlling active power and reactive power independently of each other. For example, AC/DC converters 5A, 5B are each formed of a modular multilevel converter (MMC).

Figure 2:
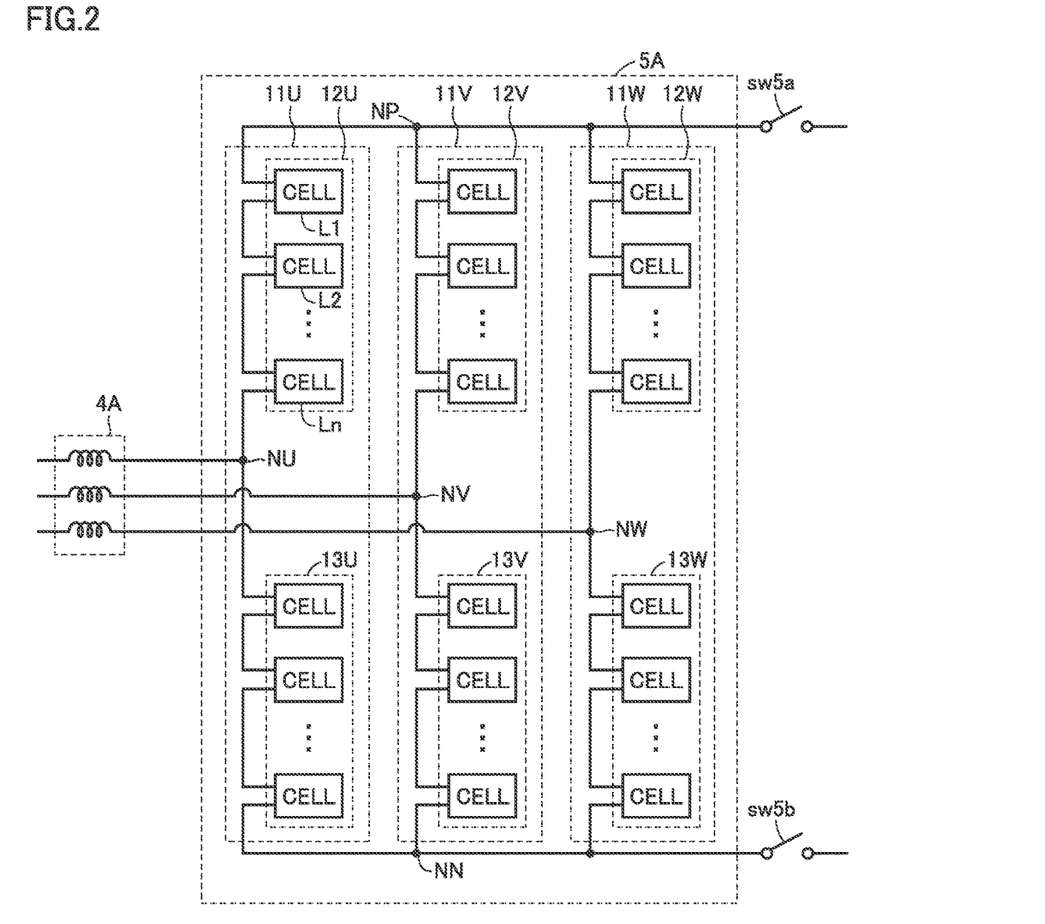
FIG. 2 is a circuit diagram showing an overall configuration of an AC/DC converter.

FIG. 2 is a circuit diagram showing an overall configuration of the AC/DC converter. AC/DC converter 5A is described as a representative hereinafter since AC/DC converter 5B has the same circuit configuration as that of AC/DC converter 5A.

Referring to FIG. 2, AC/DC converter 5A includes leg circuits 11U, 11V, 11W. Leg circuit 11 is provided for each of a plurality of phases constituting AC, and performs power conversion. FIG. 2 shows a case of power system 1A being a three-phase AC system, in which case three leg circuits 11U, 11V, 11W are provided for U-phase, V-phase, and W-phase, respectively. AC terminals NU, NV, NW provided for leg circuits 11U, 11V, 11W, respectively, are connected to power system 1A (transmission line 2A) via interconnected reactor 4A. A positive DC terminal NP and a negative DC terminal NN provided to be shared by leg circuits 11 are connected to a positive DC terminal NP and a negative DC terminal NN of AC/DC converter 5B via switches sw5a, sw5b, respectively.

Although FIG. 2 shows a configuration where leg circuits 11U, 11V, 11W include AC terminals NU, NV, NW, respectively, this configuration is not restrictive. For example, in place of AC terminals NU, NV, NW, leg circuits 11U, 11V, 11W may include their respective primary windings, and leg circuits 11U, 11V, 11W may be connected to interconnected reactor 4A with respect to AC, with secondary windings magnetically coupled with these primary windings. In other words, leg circuits 11 are electrically connected to interconnected reactor 4A through the connection portions provided for leg circuits 11U, 11V, 11W, such as AC terminals NU, NV, NW or the above-described primary windings.

Leg circuit 11U includes a positive-side arm (upper arm) 12U from positive DC terminal NP to AC terminal NU, and a negative-side arm (lower arm) 13U from negative DC terminal NN to AC terminal NU. AC terminal NU serving as a connection point between positive-side arm 12U and negative-side arm 13U is connected to interconnected reactor 4A. Leg circuit 11U is described as a representative hereinafter since leg circuits 11V, 11W also have the same configuration.

Positive-side arm 12U includes a plurality of cells (chopper cells) L1 to Ln connected in cascade. Similarly, negative-side arm 13U includes a plurality of cells L1 to Ln connected in cascade.

Figure 3:
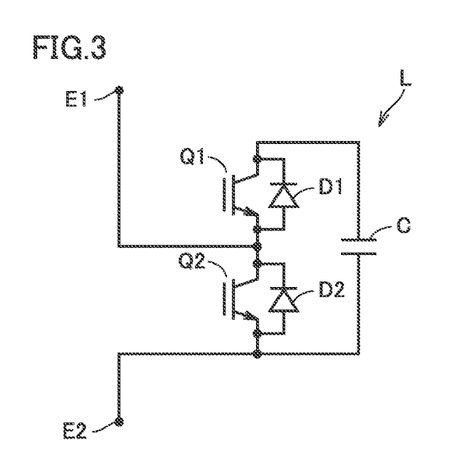
FIG. 3 shows a circuit configuration of a cell.

FIG. 3 shows a circuit configuration of a cell L. The configuration of cells L1 to Ln is the same as the configuration of cell L shown in FIG. 3. Referring to FIG. 3, cell L includes two switching elements Q1, Q2, two diodes D1, D2, and a capacitor C. Cell L is operated (driven) by switching of two switching elements Q1, Q2 based on a gate signal transmitted from control device 10. Switching elements Q1, Q2 are each a power semiconductor element such as an IGBT (Insulated Gate Bipolar Transistor).

Two switching elements Q1, Q2 are connected in series. Diodes D1, D2 are free wheeling diodes connected in anti-parallel with switching elements Q1, Q2, respectively. Capacitor C acting as an energy storage element is connected in parallel with series-connected switching elements Q1, Q2. Typically, a cell terminal E1 drawn out from one end of switching element Q2 is connected to a cell terminal E2 of an adjacent cell L on the positive side. Cell terminal E2 drawn out from the other end of switching element Q2 is connected to cell terminal E1 of an adjacent cell L on the negative side.

Each of AC/DC converters 5A, 5B does not need to be formed of a modular multilevel converter, as long as it is a self-excited voltage-side AC/DC converter. For example, the circuit system of each of AC/DC converters 5A, 5B may be configured with a two-level converter that converts AC power into two-level DC power, or a three-level converter that converts AC power into three-level DC power.

Referring again to FIG. 1, a current transformer CT1, which is a sensor for current detection, detects each phase current of transmission line 2A, and inputs a current value of each phase current into control device 10. Similarly, a current transformer CT2 detects each phase current of transmission line 2B, and inputs a current value of each phase current into control device 10.

A voltage transformer VT1, which is a sensor for voltage detection, detects each phase voltage of transmission line 2A, and inputs a voltage value of each phase voltage into control device 10. Similarly, a voltage transformer VT2 detects each phase voltage of transmission line 2B, and inputs a voltage value of each phase voltage into control device 10.

Control device 10 performs various processes based on the input current values and voltage values. Specifically, control device 10 performs operation control of AC/DC converters 5A, 5B, switching control of switches sw, a fault determination, and the like. Specific contents of the processes by control device 10 will be described later.

<Hardware Configuration of Control Device>

Figure 4:
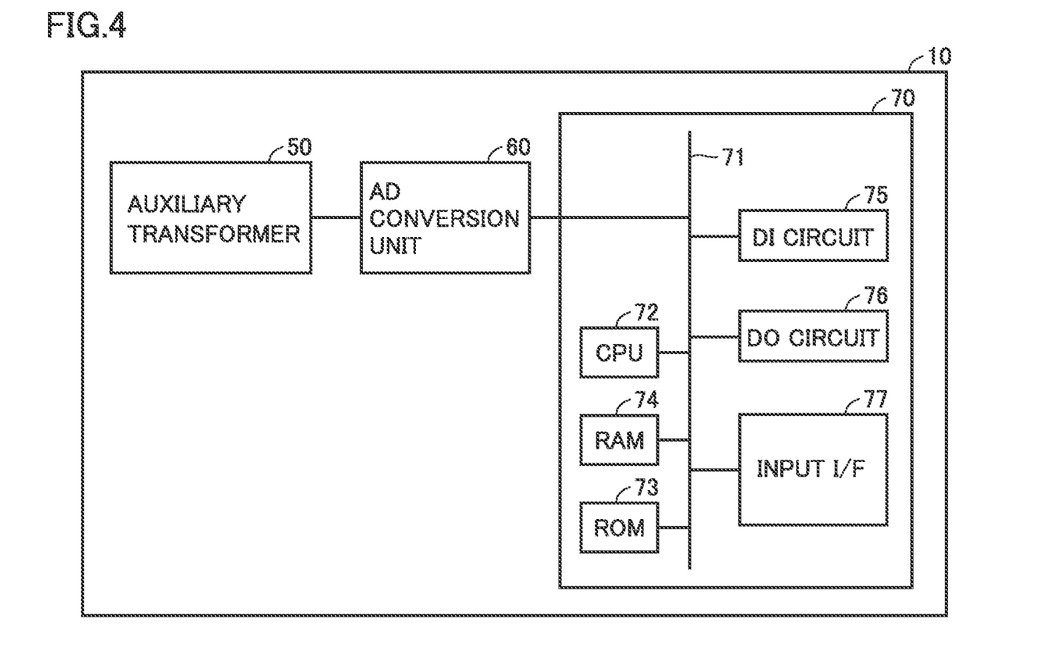
FIG. 4 shows an example of a hardware configuration of a control device.

FIG. 4 shows an example of a hardware configuration of control device 10. Referring to FIG. 4, control device 10 includes an auxiliary transformer 50, an AD (Analog to Digital) conversion unit 60, and an operation processing unit 70.

Auxiliary transformer 50 acquires a system electrical quantity from current transformers CT1, CT2 and voltage transformers VT1, VT2, converts it into a smaller electrical quantity, and outputs it.

AD conversion unit 60 acquires the system electrical quantity (analog quantity) output from auxiliary transformer 50, and converts it into digital data. Specifically, AD conversion unit 60 includes an analog filter, a sample hold circuit, a multiplexer, and an AD converter.

The analog filter removes a high-frequency noise component from each of waveform signals of a current and a voltage output from auxiliary transformer 50. The sample hold circuit samples the waveform signals of the current and the voltage output from the analog filter at a predetermined sampling cycle. Based on a timing signal input from operation processing unit 70, the multiplexer sequentially switches the waveform signal input from the sample hold circuit in chronological order, and inputs it into the AD converter. The AD converter converts the waveform signal input from the multiplexer from analog data to digital data. The AD converter outputs the digitally converted waveform signal (digital data) to operation processing unit 70.

Operation processing unit 70 includes a CPU (Central Processing Unit) 72, a ROM 73, a RAM 74, a DI (digital input) circuit 75, a DO (digital output) circuit 76, and an input interface (I/F) 77. These are coupled by a bus 71.

CPU 72 controls operation of control device 10 by reading and executing a program stored beforehand in ROM 73. ROM 73 stores various types of information used by CPU 72. CPU 72 is a microprocessor, for example. The hardware may be an FPGA (Field Programmable Gate Array), an ASIC (Application Specific Integrated Circuit), and another circuit having an operation function, other than a CPU.

CPU 72 acquires the digital data from AD conversion unit 60 via bus 71. CPU 72 performs a control operation using the acquired digital data, according to the program stored in ROM 73. Based on the result of the control operation, CPU 72 outputs a control command to each of AC/DC converters 5A, 5B and switches SW via DO circuit 76. CPU 72 also receives a response to the control command via DI circuit 75. Input interface 77 typically includes various buttons and the like, and accepts various setting operations from a system operator.

<Operation Modes>

Control device 10 according to the present embodiment is configured to perform power control in a plurality of operation modes. Referring now to FIGS. 5 to 10, each operation mode is specifically described.

Figure 5:
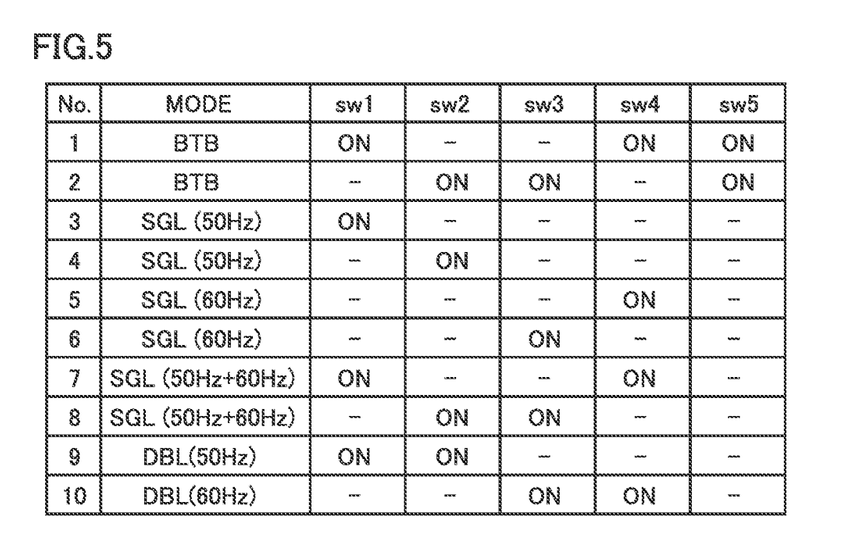
FIG. 5 illustrates relation between each mode and an opened/closed state of each switch.
Figure 6:
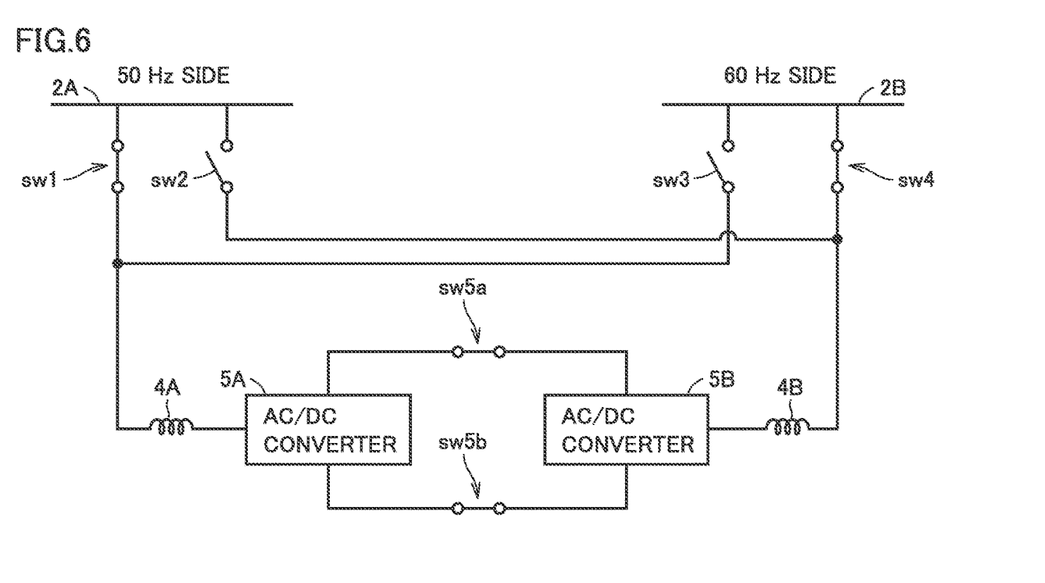
FIG. 6 illustrates a BTB mode.
Figure 7:
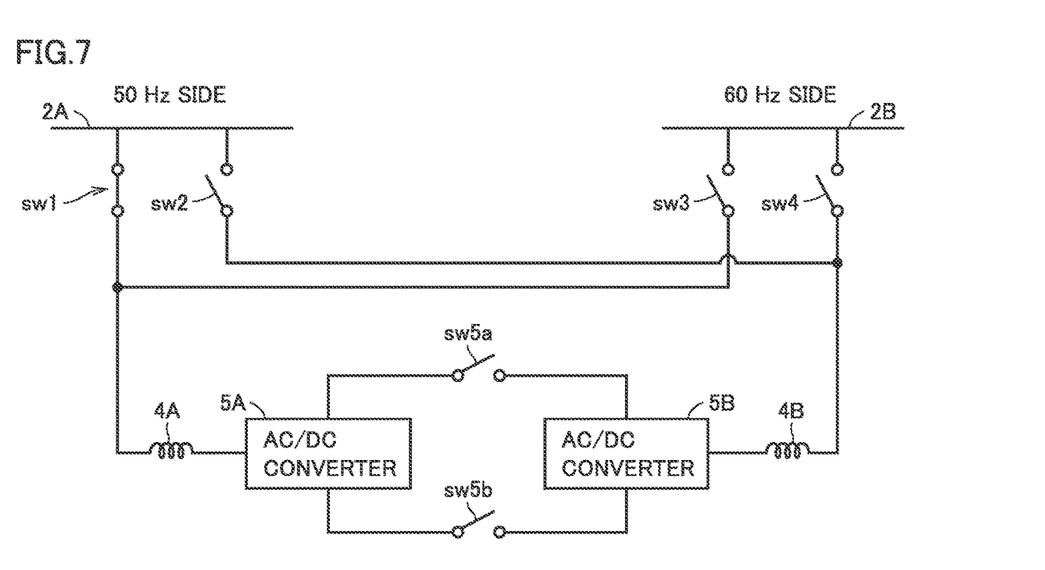
FIG. 7 illustrates a single STATCOM mode (50 Hz).
Figure 8:
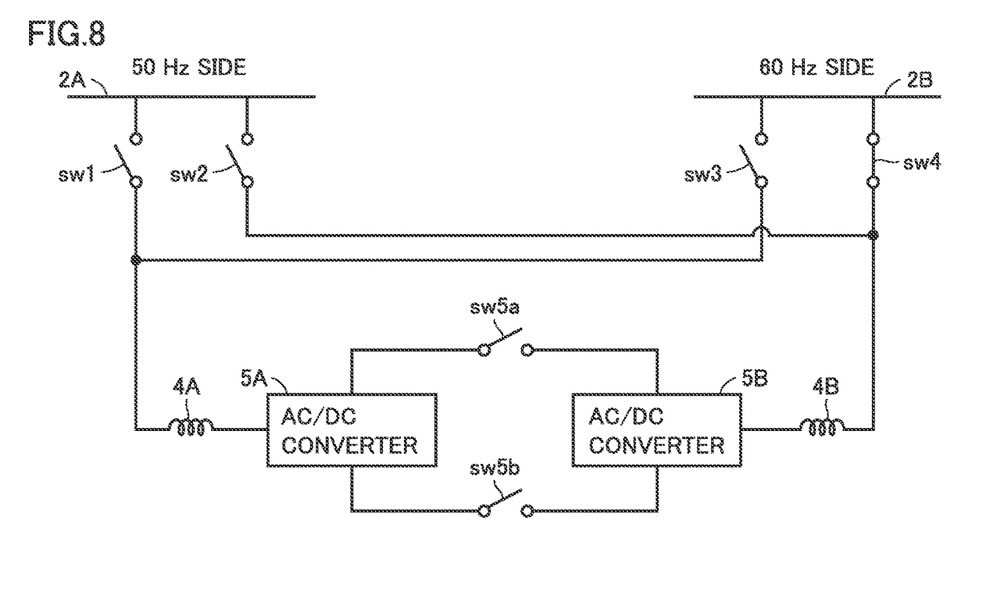
FIG. 8 illustrates a single STATCOM mode (60 Hz).
Figure 9:
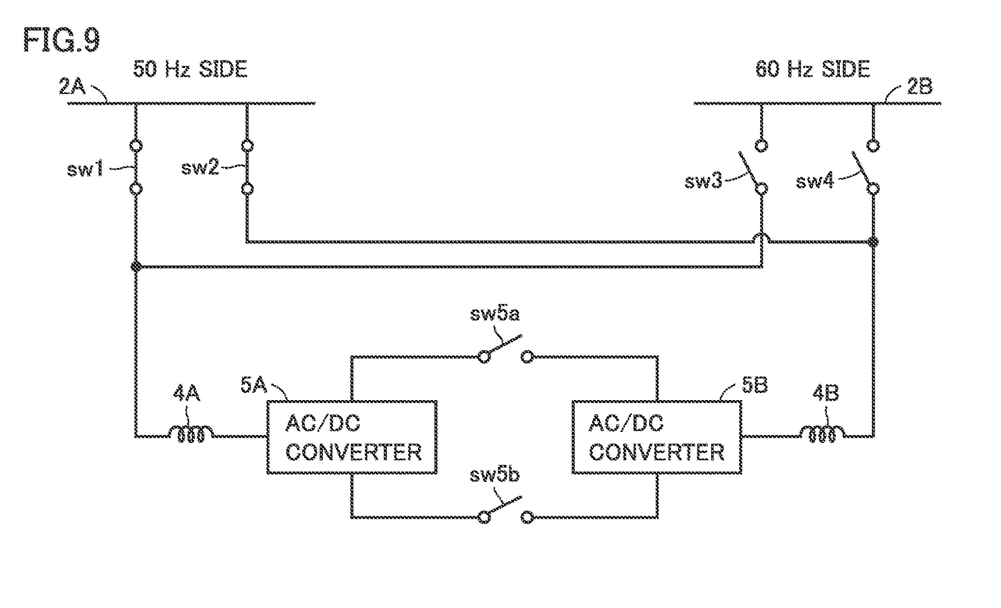
FIG. 9 illustrates a double STATCOM mode (50 Hz).
Figure 10:
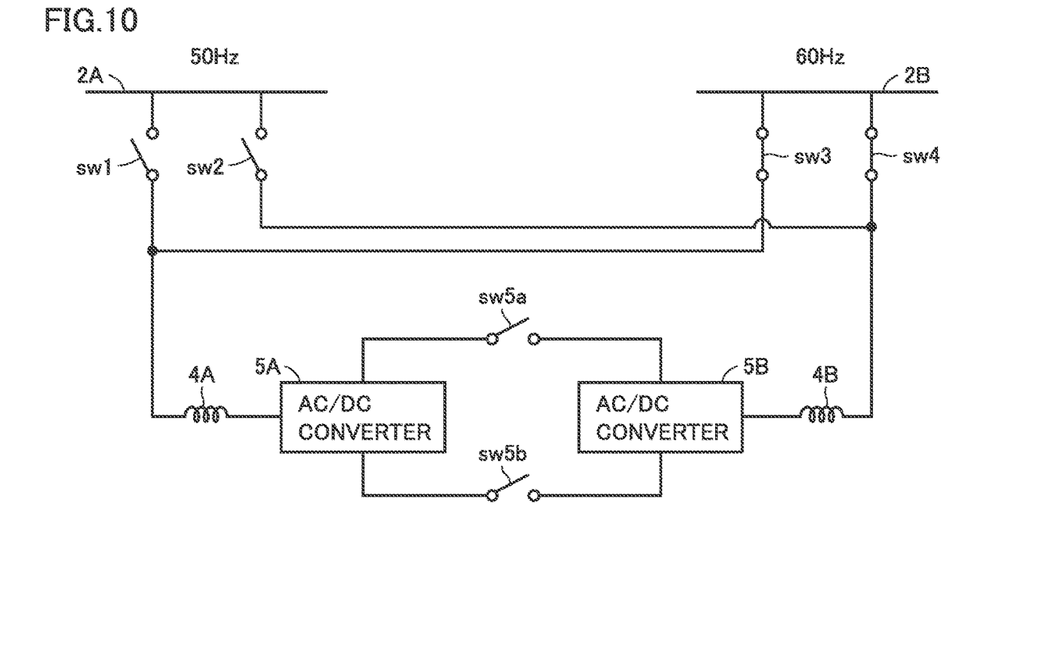
FIG. 10 illustrates a double STATCOM mode (60 Hz).

FIG. 5 illustrates relation between each mode and an opened/closed state of each switch. In FIG. 5, switches sw5a, sw5b are referred to collectively as switches sw5. FIG. 6 illustrates a BTB mode. FIG. 7 illustrates a single STATCOM mode (50 Hz). FIG. 8 illustrates a single STATCOM mode (60 Hz). FIG. 9 illustrates a double STATCOM mode (50 Hz). FIG. 10 illustrates a double STATCOM mode (60 Hz). Although part of the configuration of power control system 1000 is not shown in FIGS. 6 to 10 in order to simplify the description, the system is configured as shown in FIG. 1 described above.

(BTB Mode)

Referring to FIGS. 5 and 6, the BTB mode is described. When each of AC/DC converters 5A, 5B is caused to operate in the BTB mode, control device 10 controls each of switches sw1, sw4, sw5 to be ON (closed state), and controls each of switches sw2, sw3 to be OFF (opened state) (which corresponds to the BTB mode of No. 1 in FIG. 5). The BTB mode is a mode in which a so-called BTB method of temporarily converting AC power into DC and then outputting AC is employed. The BTB mode is a mode in which a so-called BTB method of temporarily converting AC power into DC and then outputting AC is employed. In the BTB mode, for example, active power is transmitted from power system 1A to power system 1B (or in the opposite direction), and reactive power compensation is conducted at the same time. In the STATCOM mode, for example, the transmission of the active power is stopped, and reactive power compensation which will be described later is conducted. It should be noted that "ON" in FIG. 5 indicates that the switch is ON, and the sign "-" in FIG. 5 indicates that the switch is OFF.

Here, when power is to be transmitted from power system 1A to power system 1B, control device 10 causes AC/DC converter 5A to operate as a rectifier, and causes AC/DC converter 5B to operate as an inverter. As a result, AC power of 50 Hz supplied from power system 1A is converted into DC power by AC/DC converter 5A, and this converted DC power is converted into AC power of 60 Hz by AC/DC converter 5B and supplied to power system 1B.

When power is to be transmitted from power system 1B to power system 1A, on the other hand, control device 10 causes AC/DC converter 5B to operate as a rectifier, and causes AC/DC converter 5A to operate as an inverter. As a result, AC power of 60 Hz supplied from power system 1B is converted into DC power by AC/DC converter 5B, and this converted DC power is converted into AC power of 50 Hz by AC/DC converter 5A and supplied to power system 1A.

As shown in FIG. 5, when AC/DC converters 5A, 5B are caused to operate in the BTB mode, control device 10 may control each of switches sw2, sw3, sw5 to be ON, and control each of switches sw1, sw4 to be OFF (which corresponds to the BTB mode of No. 2 in FIG. 5). When power is to be transmitted from power system 1A to power system 1B, control device 10 causes AC/DC converter 5B to operate as a rectifier, and causes AC/DC converter 5A to operate as an inverter. When power is to be transmitted from power system 1B to power system 1A, control device 10 causes AC/DC converter 5A to operate as a rectifier, and causes AC/DC converter 5B to operate as an inverter.

(Single STATCOM Mode)

Next, the single STATCOM mode is described. Referring to FIGS. 5 and 7, control device 10 causes AC/DC converter 5A to operate in the STATCOM mode by controlling only switch sw1 to be ON, and controlling each of remaining switches sw2 to sw5b to be OFF (which corresponds to the SGL (50 Hz) mode of No. 3 in FIG. 5). The STATCOM mode is a mode in which AC/DC converter 5A is caused to operate as a reactive power compensation device. Moreover, a mode in which one of AC/DC converter 5A and AC/DC converter 5B (in this case, AC/DC converter 5A) is interconnected to a single power system and this AC/DC converter is caused to operate as a reactive power compensation device is herein referred to as "single STATCOM mode." This corresponds to the "SGL" modes in FIG. 5.

In the example of FIG. 7, control device 10 causes single AC/DC converter 5A to be interconnected to power system 1A, and causes AC/DC converter 5A to operate as a reactive power compensation device that compensates for a reactive power quantity depending on voltage fluctuation. Control device 10 controls reactive power output from AC/DC converter 5A to interconnected reactor 4A such that the system voltage of power system 1A is kept constant. Typically, if the system voltage is lower than a reference voltage, control device 10 controls operation of AC/DC converter 5A to supply lagging reactive power to power system 1A, to thereby raise the system voltage. If the system voltage is higher than the reference voltage, on the other hand, control device 10 controls operation of AC/DC converter 5A to supply leading reactive power to power system 1A, to thereby lower the system voltage.

Control device 10 may cause AC/DC converter 5B to operate in the STATCOM mode by controlling only switch sw2 to be ON, and controlling each of remaining switches sw1, sw3 to sw5 to be OFF (which corresponds to the SGL (50 Hz) mode of No. 4 in FIG. 5). In this case, control device 10 controls reactive power output from AC/DC converter 5B to interconnected reactor 4B such that the system voltage of power system 1A is kept constant.

Referring to FIGS. 5 and 8, control device 10 causes AC/DC converter 5B to operate in the STATCOM mode by controlling only switch sw4 to be ON, and controlling each of remaining switches sw1 to sw3, sw5 to be OFF (which corresponds to the SGL (60 Hz) mode of No. 5 in FIG. 5). In this case, control device 10 controls reactive power output from AC/DC converter 5B to interconnected reactor 4B such that the system voltage of power system 1B is kept constant.

Control device 10 may cause AC/DC converter 5A to operate in the STATCOM mode by controlling only switch sw3 to be ON, and controlling each of remaining switches sw1, sw2, sw4, sw5 to be OFF (which corresponds to the SGL (60 Hz) mode of No. 6 in FIG. 5). In this case, control device 10 controls reactive power output from AC/DC converter 5A to interconnected reactor 4A such that the system voltage of power system 1B is kept constant.

The SGL (50 Hz) mode of No. 3 and the SGL (60 Hz) mode of No. 5 can be applied simultaneously. Specifically, control device 10 causes AC/DC converter 5A and AC/DC converter 5B to operate in the STATCOM mode by controlling switches sw1, sw4 to be ON, and controlling each of remaining switches sw2, sw3, sw5 to be OFF (which corresponds to the SGL (50 Hz+60 Hz) mode of No. 7 in FIG. 5). Control device 10 controls reactive power output from AC/DC converter 5A to interconnected reactor 4A such that the system voltage of power system 1A is kept constant, and controls reactive power output from AC/DC converter 5B to interconnected reactor 4B such that the system voltage of power system 1B is kept constant.

Similarly, control device 10 may cause AC/DC converter 5A and AC/DC converter 5B to operate in the STATCOM mode by controlling switches sw2, sw3 to be ON, and controlling each of remaining switches sw1, sw4, sw5 to be OFF (which corresponds to the SGL (50 Hz+60 Hz) mode of No. 8 in FIG. 5). In this case, control device 10 controls reactive power output from AC/DC converter 5B to interconnected reactor 4B such that the system voltage of power system 1A is kept constant, and controls reactive power output from AC/DC converter 5A to interconnected reactor 4A such that the system voltage of power system 1B is kept constant.

(Double STATCOM Mode)

Next, the double STATCOM mode is described. Referring to FIGS. 5 and 9, control device 10 causes AC/DC converter 5A and AC/DC converter 5B to operate in the STATCOM mode by controlling switches sw1, sw2 to be ON, and controlling each of remaining switches sw3 to sw5 to be OFF (which corresponds to the DBL (50 Hz) mode of No. 9 in FIG. 5). A mode in which both AC/DC converter 5A and AC/DC converter 5B are interconnected to a single power system and these AC/DC converters are caused to operate as reactive power compensation devices in this manner is herein referred to as "double STATCOM mode." This corresponds to the "DBL" modes in FIG. 5.

In the example of FIG. 9, control device 10 causes AC/DC converters 5A, 5B to be interconnected to power system 1A, and causes AC/DC converters 5A, 5B to operate as reactive power compensation devices. Control device 10 controls reactive power output from AC/DC converter 5A to interconnected reactor 4A, and reactive power output from AC/DC converter 5B to interconnected reactor 4B, such that the system voltage of power system 1A is kept constant. The double STATCOM mode, in which the output quantity of reactive power is higher than in the single STATCOM mode, is effective when substantial voltage fluctuation occurs in the power system and thus there is an insufficient capacity with only a single reactive power compensation device.

Referring to FIGS. 5 and 10, control device 10 causes AC/DC converter 5A and AC/DC converter 5B to operate in the STATCOM mode by controlling switches sw1, sw2 to be ON, and controlling each of remaining switches sw3 to sw5 to be OFF (which corresponds to the DBL (60 Hz) mode of No. 10 in FIG. 5). In this case, control device 10 controls reactive power output from AC/DC converter 5A to interconnected reactor 4A, and reactive power output from AC/DC converter 5B to interconnected reactor 4B, such that the system voltage of power system 1B is kept constant.

(Switching Among Operation Modes)

Here, a method of switching among the aforementioned plurality of operation modes is described. Typically, control device 10 performs switching among the aforementioned operation modes by accepting an instruction from the system operator via input interface 77.

Control device 10 is also configured to automatically perform switching among the operation modes based on a predetermined condition. Specifically, when control device 10 determines that a permanent fault has occurred in power system 1A (or power system 1B) while control device 10 is causing AC/DC converters 5A, 5B to operate in the BTB mode, control device 10 is configured to cause AC/DC converters 5A, 5B to operate in the STATCOM mode depending on the location where the permanent fault has occurred. The permanent fault does not refer to a fault from which automatic recovery to steady state can be made when the fault is extinguished, such as a transient fault, but refers to a fault from which recovery has to be made through repairs and checking by humans, such as a device failure.

Particularly, when a permanent fault occurs in power system 1A (for example, transmission line 2A), control device 10 controls each of switches sw1, sw2, sw5 to be OFF, and controls at least one of switch sw3 and switch sw4 to be ON. When control device 10 controls switch sw3 to be ON, control device 10 causes AC/DC converter 5A to operate as a reactive power compensation device (in the STATCOM mode). When control device 10 controls switch sw4 to be ON, control device 10 causes AC/DC converter 5B to operate as a reactive power compensation device. Control device 10 may cause both AC/DC converters 5A, 5B to operate as reactive power compensation devices by controlling both switches sw3, sw4 to be ON.

Typically, control device 10 determines that a permanent fault has occurred in power system 1A (transmission line 2A) when a control operation is performed based on at least one of the current value acquired from current transformer CT1 and the voltage value acquired from voltage transformer VT1, and an operation value is higher than a set value. Control device 10 may accept a notification indicating that a permanent fault has occurred in power system 1A from an external device.

When a permanent fault occurs in power system 1B (for example, transmission line 2B), control device 10 controls each of switches sw3 to sw5 to be OFF, and controls at least one of switch sw1 and switch sw2 to be ON. When control device 10 controls switch sw1 to be ON, control device 10 causes AC/DC converter 5A to operate as a reactive power compensation device. When control device 10 controls switch sw2 to be ON, control device 10 causes AC/DC converter 5B to operate as a reactive power compensation device. Control device 10 may cause both AC/DC converters 5A, 5B to operate as reactive power compensation devices by controlling both switches sw1, sw2 to be ON.

As a result, AC/DC converters 5A, 5B can be quickly disconnected from the power system in which the permanent fault has occurred, and at least one of AC/DC converters 5A, 5B can be utilized as a reactive power compensation device for the power system in which the permanent fault has not occurred.

As another example, when control device 10 is controlling the AC/DC converters (and each switch) in the single STATCOM mode (No. 3 to No. 6 in FIG. 5), and substantial voltage fluctuation occurs in the power system and thus there is an insufficient output capacity with only a single reactive power compensation device, control device 10 may be configured to perform switching to the double STATCOM mode.

For example, it is assumed that control device 10 is causing AC/DC converter 5A to operate as a reactive power compensation device, and only switch sw1 is ON (which corresponds to No. 3 in FIG. 5). Here, when control device 10 determines, based on the electrical quantity of power system 1A, that reactive power that can be output from AC/DC converter 5A to power system 1A is smaller than a reactive power target value required to maintain the voltage of power system 1A, control device 10 further causes switch sw2 to be ON, and causes AC/DC converter 5B to operate as a reactive power compensation device. In other words, control device 10 causes AC/DC converters 5A, 5B to operate in the double STATCOM mode (which corresponds to No. 9 in FIG. 5).

Typically, the reactive power quantity that can be output from AC/DC converters 5A, 5B is stored beforehand in ROM 73, RAM 74 of control device 10. The reactive power target value may be stored beforehand in ROM 73, RAM 74 of control device 10, or may be configured to be received from an external device, for example.

As a result, even when substantial voltage fluctuation occurs in the power system, appropriate reactive power can be quickly output to the power system. As a result, adverse effects on customers and the like due to the voltage fluctuation can be eliminated.

Typically, control device 10 controls AC/DC converters 5A, 5B in the BTB mode during normal operation. Then, when a permanent fault or the like occurs in the power system, resulting in failure to perform control in the BTB mode, control device 10 controls AC/DC converters 5A, 5B in the STATCOM mode as described above. If the STATCOM mode has been preset by the system operator, however, control device 10 may control AC/DC converters 5A, 5B in the STATCOM mode during normal operation.

<Functional Configuration of Control Device 10>

Figure 11:
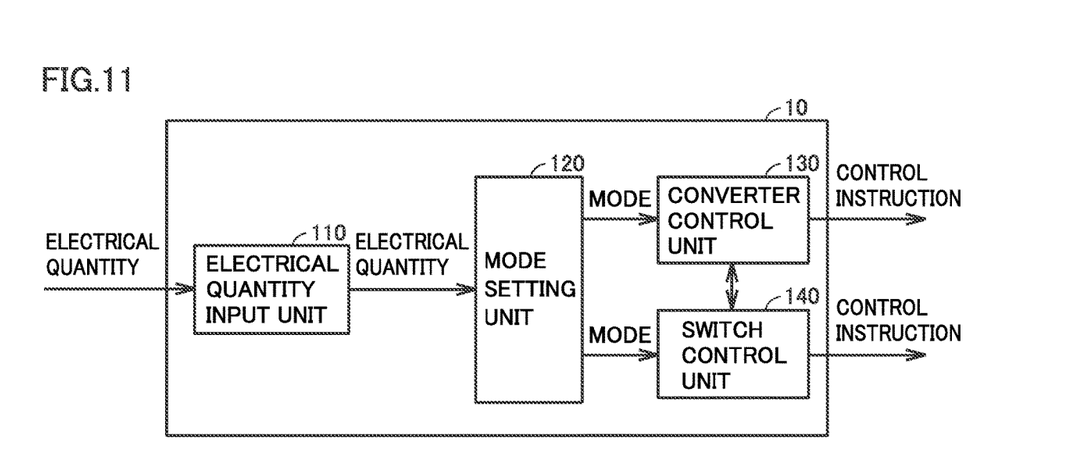
FIG. 11 is a functional block diagram of the control device.

FIG. 11 is a functional block diagram of control device 10. Referring to FIG. 11, control device 10 includes an electrical quantity input unit 110, a mode setting unit 120, a converter control unit 130, and a switch control unit 140. Each of these functions is implemented, for example, by CPU 72 of operation processing unit 70 executing the program stored in ROM 73. Some or all of these functions may be configured to be implemented by hardware.

Electrical quantity input unit 110 accepts input of an electrical quantity of the power system. Specifically, electrical quantity input unit 110 accepts input of each phase voltage value of transmission line 2A to be monitored by control device 10 from voltage transformer VT1, and accepts input of each phase current value of transmission line 2A from current transformer CT1. Electrical quantity input unit 110 also accepts input of each phase voltage value of transmission line 2B to be monitored by control device 10 from voltage transformer VT2, and accepts input of each phase current value of transmission line 2B from current transformer CT2.

Mode setting unit 120 performs switching among the plurality of operation modes shown in FIG. 5 based on a predetermined condition. In one aspect, mode setting unit 120 accepts an instruction from the system operator via input interface 77, and sets an operation mode in accordance with the instruction.

In another aspect, when a permanent fault occurs in power system 1A while AC/DC converters 5A, 5B are operating as AC/DC converters in the BTB method, mode setting unit 120 sets an operation mode in which switches sw1, sw2, sw5 are controlled to be OFF and at least one of switch sw3 and switch sw4 is controlled to be ON (No. 5, No. 6 or No. 10 in FIG. 5). When a permanent fault occurs in power system 1B while AC/DC converters 5A, 5B are operating as AC/DC converters in the BTB method, on the other hand, mode setting unit 120 sets an operation mode in which at least one of switch sw1 and switch sw2 is controlled to be ON (that is, each of switches sw3 to sw5 is controlled to be OFF) (No. 3, No. 4 or No. 9 in FIG. 5).

Mode setting unit 120 may determine that a permanent fault has occurred in power systems 1A, 1B when mode setting unit 120 performs a control operation based on the electrical quantity accepted by electrical quantity input unit 110, and an operation value is higher than a set value. Alternatively, mode setting unit 120 may accept a notification indicating that a permanent fault has occurred in power system 1A (and 1B) from an external device through a communication interface mounted on control device 10.

In yet another aspect, when the operation mode has been set to the single STATCOM mode (No. 3 to No. 6 in FIG. 5), and mode setting unit 120 determines that substantial voltage fluctuation occurs in the power system and thus there is an insufficient output capacity with only a single reactive power compensation device, mode setting unit 120 switches the operation mode to the double STATCOM mode. For example, when AC/DC converter 5A is operating as a reactive power compensation device, switch sw1 of switches sw1 to sw5 is ON and the remaining switches are OFF, and mode setting unit 120 determines that reactive power that can be output from AC/DC converter 5A to power system 1A is smaller than a reactive power target value required to maintain the voltage of power system 1A, then mode setting unit 120 sets an operation mode in which both switches sw1, sw2 are controlled to be ON (No. 9 in FIG. 5). As another example, when AC/DC converter 5B is operating as a reactive power compensation device, only switch sw4 is ON, and mode setting unit 120 determines that reactive power that can be output from AC/DC converter 5B to power system 1B is smaller than a reactive power target value required to maintain the voltage of power system 1B, then mode setting unit 120 sets an operation mode in which both switches sw3, sw4 are controlled to be ON (No. 10 in FIG. 5).

Mode setting unit 120 outputs information indicating the operation mode set as described above (mode information) to converter control unit 130 and switch control unit 140.

Converter control unit 130 controls operation of AC/DC converters 5A, 5B in accordance with the mode information. Typically, converter control unit 130 transmits a gate signal to each of cells L1 to Ln to perform switching of two switching elements Q1, Q2, thereby driving each of cells L1 to Ln. Switch control unit 140 controls switching operation of each of switches sw1 to sw5 in accordance with the operation mode information. Typically, switch control unit 140 transmits, to each switch, a control command (turn-on command) for controlling each of switches sw1 to sw5 to be ON, and a control command (turn-off command) for controlling each of switches sw1 to sw5 to be OFF.

In the following, the configurations of converter control unit 130 and switch control unit 140 are specifically described.

When converter control unit 130 causes AC/DC converters 5A, 5B to operate as power converters in the BTB method, switch control unit 140 controls at least switches sw5 to be in a closed state (No. 1 to No. 2 in FIG. 5). More specifically, switch control unit 140 controls switches sw1, sw4, sw5 to be in a closed state, and switches sw2, sw3 to be in an opened state. Alternatively, switch control unit 140 controls switches sw2, sw3, sw5 to be in a closed state, and switches sw1, sw4 to be in a closed state.

When converter control unit 130 causes AC/DC converters 5A, 5B to operate as reactive power compensation devices, on the other hand, switch control unit 140 controls at least switches sw5 to be in an opened state (No. 3 to No. 10 in FIG. 5). More specifically, when AC/DC converter 5A is caused to operate as a reactive power compensation device, switch control unit 140 controls switches sw5 to be in an opened state, and further controls one of switches sw1, sw3 to be in a closed state and the other to be in an opened state (No. 3, No. 6 to No. 10 in FIG. 5). When AC/DC converter 5B is caused to operate as a reactive power compensation device, switch control unit 140 controls switches sw5 to be in an opened state, and further controls one of switches sw2, sw4 to be in a closed state and the other to be in an opened state (No. 4 to No. 5, No. 7 to No. 10 in FIG. 5).

<Procedure>

Figure 12:
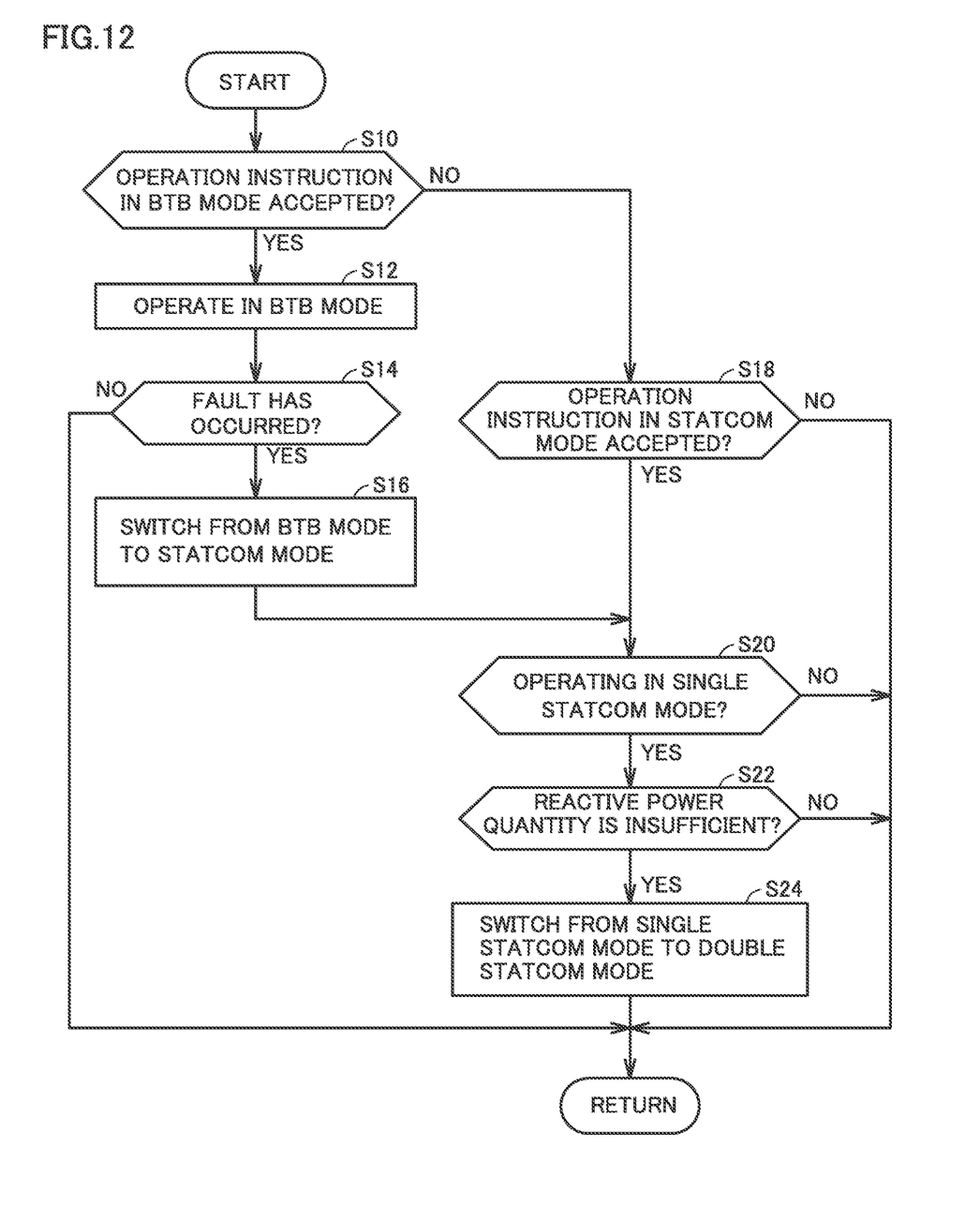
FIG. 12 is a flowchart showing a procedure of the control device.

FIG. 12 is a flowchart showing a procedure of control device 10. Typically, each of the following steps is performed by operation processing unit 70 of control device 10. Control device 10 is to continuously monitor the current values input from current transformers CT1, CT2 and the voltage values input from voltage transformers VT1, VT2.

Referring to FIG. 12, control device 10 determines whether or not an operation instruction in the BTB mode has been accepted from the system operator via input interface 77 (step S10). When the operation instruction has been accepted (YES in step S10), control device 10 causes AC/DC converters 5A, 5B and each of switches sw1 to sw5 to operate in the BTB mode (No. 1 or No. 2 in FIG. 5) (step S12). Subsequently, control device 10 determines whether or not a permanent fault has occurred in power system 1A or 1B (step S14). When a permanent fault has not occurred (NO in step S14), control device 10 ends the process. When a permanent fault has occurred (YES in step S14), on the other hand, control device 10 switches the operation mode from the BTB mode to the STATCOM mode (step S16), and performs a process of step S20 which will be described later.

Returning back to step S10, when the operation instruction in the BTB mode has not been accepted (NO in step S10), control device 10 determines whether or not an operation instruction in the STATCOM mode has been accepted (step S18). When the operation instruction has not been accepted (NO in step S18), control device 10 ends the process. When the operation instruction has been accepted (YES in step S18), on the other hand, control device 10 determines whether or not the current operation mode is the single STATCOM mode (step S20). Specifically, when switching was performed from the BTB mode to the single STATCOM mode in step S16, or when the operation instruction in the single STATCOM mode was accepted in step S18, the current operation mode is the single STATCOM mode.

When the current operation mode is not the single STATCOM mode (that is, when the current operation mode is the double STATCOM mode) (NO in step S20), control device 10 ends the process. When the current operation mode is the single STATCOM mode (YES in step S20), on the other hand, control device 10 determines whether or not reactive power that can be output from AC/DC converter 5A or 5B is insufficient with respect to a reactive power target value (step S22). When the reactive power is sufficient (NO in step S22), control device 10 ends the process. When the reactive power is insufficient (YES in step S22), control device 10 switches the operation mode from the single STATCOM mode to the double STATCOM mode (step S24), and ends the process.

<Other Embodiments>

Power control system 1000 shown in FIG. 1 of the embodiment described above may further include a server device for remotely controlling each of AC/DC converters 5A, 5B and each of switches sw1 to sw5 by providing instructions to control device 10. In this case, the server device is configured to communicate with control device 10, to provide various instructions to control device 10 and receive various types of information from control device 10. The server device has some or all of the functions of control device 10 described above.

Typically, the server device provides an instruction about operation mode setting (the function of mode setting unit 120), an instruction about operation control of AC/DC converters 5A, 5B (the function of converter control unit 130), and an instruction about operation control of each of switches sw1 to sw5 (the function of switch control unit 140) to control device 10. Control device 10 controls operation of each AC/DC converter and each switch in accordance with the instructions. The server device receives information about electrical quantity of power systems 1A, 1B, and information required to implement each of the above-described functions from control device 10.

The configuration illustrated as the above-described embodiment is one example of the configuration of the present invention, and can be combined with other known techniques, or can be varied in configuration, such as by being partially omitted, within the scope not departing from the gist of the present invention.

Moreover, in the above-described embodiment, the processes and configurations described in the other embodiments may be adopted and implemented as appropriate.

<Advantages>

According to the present embodiment, even when a plurality of power systems have different system frequencies, power can be applied in various operation modes such as the BTB mode, the single STATCOM mode, and the double STATCOM mode. Accordingly, flexible and appropriate power control can be implemented in the plurality of power systems having system frequencies different from each other.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1A, 1B power system; 2A, 2B transmission line; 4A, 4B interconnected reactor; 5A, 5B AC/DC converter; 10 control device; 11U, 11V, 11W leg circuit; 12U, 12V, 12W positive-side arm; 13U, 13V, 13W negative-side arm; 50 auxiliary transformer; 60 conversion unit; 70 operation processing unit; 71 bus; 72 CPU; 73 ROM; 74 RAM; 75 DI circuit; 76 DO circuit; 77 input interface; 110 electrical quantity input unit; 120 mode setting unit; 130 converter control unit; 140 switch control unit; 1000 power control system; C capacitor; CT1, CT2 current transformer; D1, D2 diode; E1, E2 cell terminal; L cell; NN negative DC terminal; NP positive DC terminal; NU, NV, NW AC terminal; Q1, Q2 switching element; sw1 to sw5b switch; VT1, VT2 voltage transformer.

The invention claimed is:

1. A power control system comprising:
a first AC/DC converter;
a second AC/DC converter;
a first switch connected between a first transmission line of a first power system having a first system frequency and the first AC/DC converter;
a second switch connected between the first transmission line and the second AC/DC converter;
a third switch connected between a second transmission line of a second power system having a second system frequency different from the first system frequency and the first AC/DC converter;
a fourth switch connected between the second transmission line and the second AC/DC converter;
a fifth switch connected between a DC terminal of the first AC/DC converter and a DC terminal of the second AC/DC converter; and
a control device configured to control operation of the first and second AC/DC converters, and the first to fifth switches,
when the first and second AC/DC converters are caused to operate as AC/DC converters in a BTB (Back to Back) method, the control device controlling at least the fifth switch to be in a closed state, and when the first and second AC/DC converters are caused to operate as reactive power compensation devices, the control device controlling at least the fifth switch to be in an opened state.

2. The power control system according to claim 1, wherein
when the first and second AC/DC converters are caused to operate as the AC/DC converters in the BTB method, the control device controls the first, fourth and fifth switches to be in a closed state and the second and third switches to be in an opened state, or controls the second, third and fifth switches to be in a closed state and the first and fourth switches to be in an opened state.

3. The power control system according to claim 2, wherein
when the first AC/DC converter is caused to operate as the reactive power compensation device, the control device controls the fifth switch to be in an opened state, and further controls one of the first and third switches to be in a closed state and the other to be in an opened state.

4. The power control system according to claim 2, wherein
when the second AC/DC converter is caused to operate as the reactive power compensation device, the control device controls the fifth switch to be in an opened state, and further controls one of the second and fourth switches to be in a closed state and the other to be in an opened state.

5. The power control system according to claim 2, wherein
the control device
controls the first, second and fifth switches to be in an opened state when a permanent fault occurs in the first power system while the first and second AC/DC converters are operating as the AC/DC converters in the BTB method,
controls at least one of the third and fourth switches to be in a closed state,
causes the first AC/DC converter to operate as the reactive power compensation device when the third switch is in a closed state, and
causes the second AC/DC converter to operate as the reactive power compensation device when the fourth switch is in a closed state.

6. The power control system according to claim 2, wherein
the first and second AC/DC converters each include a self-excited power converter.

7. The power control system according to claim 1, wherein when the first AC/DC converter is caused to operate as the reactive power compensation device, the control device controls the fifth switch to be in an opened state, and further controls one of the first and third switches to be in a closed state and the other to be in an opened state.

8. The power control system according to claim 7, wherein
when the second AC/DC converter is caused to operate as the reactive power compensation device, the control device controls the fifth switch to be in an opened state, and further controls one of the second and fourth switches to be in a closed state and the other to be in an opened state.

9. The power control system according to claim 7, wherein
the control device
controls the first, second and fifth switches to be in an opened state when a permanent fault occurs in the first power system while the first and second AC/DC converters are operating as the AC/DC converters in the BTB method,
controls at least one of the third and fourth switches to be in a closed state,
causes the first AC/DC converter to operate as the reactive power compensation device when the third switch is in a closed state, and
causes the second AC/DC converter to operate as the reactive power compensation device when the fourth switch is in a closed state.

10. The power control system according to claim 7, wherein
the first and second AC/DC converters each include a self-excited power converter.

11. The power control system according to claim 1, wherein
when the second AC/DC converter is caused to operate as the reactive power compensation device, the control device controls the fifth switch to be in an opened state, and further controls one of the second and fourth switches to be in a closed state and the other to be in an opened state.

12. The power control system according to claim 11, wherein
the control device
controls the first, second and fifth switches to be in an opened state when a permanent fault occurs in the first power system while the first and second AC/DC converters are operating as the AC/DC converters in the BTB method,
controls at least one of the third and fourth switches to be in a closed state,
causes the first AC/DC converter to operate as the reactive power compensation device when the third switch is in a closed state, and
causes the second AC/DC converter to operate as the reactive power compensation device when the fourth switch is in a closed state.

13. The power control system according to claim 11, wherein
the first and second AC/DC converters each include a self-excited power converter.

14. The power control system according to claim 1, wherein
the control device
controls the first, second and fifth switches to be in an opened state when a permanent fault occurs in the first power system while the first and second AC/DC converters are operating as the AC/DC converters in the BTB method,
controls at least one of the third and fourth switches to be in a closed state,
causes the first AC/DC converter to operate as the reactive power compensation device when the third switch is in a closed state, and
causes the second AC/DC converter to operate as the reactive power compensation device when the fourth switch is in a closed state.

15. The power control system according to claim 14, wherein
the first and second AC/DC converters each include a self-excited power converter.

16. The power control system according to claim 1, wherein
the first and second AC/DC converters each include a self-excited power converter.

17. A power control system comprising:
a first AC/DC converter;
a second AC/DC converter;
a first switch connected between a first transmission line of a first power system having a first system frequency and the first AC/DC converter;
a second switch connected between the first transmission line and the second AC/DC converter;
a third switch connected between a second transmission line of a second power system having a second system frequency different from the first system frequency and the first AC/DC converter;
a fourth switch connected between the second transmission line and the second AC/DC converter;
a fifth switch connected between a DC terminal of the first AC/DC converter and a DC terminal of the second AC/DC converter;
a control device configured to control operation of the first and second AC/DC converters, and the first to fifth switches; and
a server device configured to communicate with the control device,
when the first and second AC/DC converters are caused to operate as AC/DC converters in a BTB (Back to Back) method, the server device instructing the control device to control at least the fifth switch to be in a closed state, and when the first and second AC/DC converters are caused to operate as reactive power compensation devices, the server device instructing the control device to control at least the fifth switch to be in an opened state.

18. A control device for controlling power of a first power system having a first system frequency, and a second power system having a second system frequency different from the first system frequency, the control device comprising:
a converter control unit configured to control operation of a first AC/DC converter and a second AC/DC converter; and
a switch control unit configured to control operation of first, second, third, fourth and fifth switches,
the first switch being connected between a first transmission line of the first power system and the first AC/DC converter,
the second switch being connected between the first transmission line and the second AC/DC converter,
the third switch being connected between a second transmission line of the second power system and the first AC/DC converter, the fourth switch being connected between the second transmission line and the second AC/DC converter, the fifth switch being connected between a DC terminal of the first AC/DC converter and a DC terminal of the second AC/DC converter, when the converter control unit causes the first and second AC/DC converters to operate as AC/DC converters in a BTB (Back to Back) method, the switch control unit controlling at least the fifth switch to be in a closed state, and when the converter control unit causes the first and second AC/DC converters to operate as reactive power compensation devices, the switch control unit controlling at least the fifth switch to be in an opened state.

\* \* \* \* \*